United States Patent [19]
Tsukushi et al.

[11] Patent Number: 5,777,842
[45] Date of Patent: Jul. 7, 1998

[54] TRANSFORMER STATION AND BREAKER APPARATUS

[75] Inventors: Masanori Tsukushi, Hitachi; Youichi Ohshita, Hitachinaka; Ken'ichi Natsui; Yuzuru Kamata, both of Hitachi; Makoto Yano, Mito; Noriyuki Yaginuma; Katsuhiko Shiraishi, both of Hitachi, all of Japan

[73] Assignee: Hitachi, Ltd., Tokyo, Japan

[21] Appl. No.: 636,266

[22] Filed: Apr. 24, 1996

[30] Foreign Application Priority Data

Apr. 26, 1995 [JP] Japan .................................. 7-101883
Jun. 20, 1995 [JP] Japan .................................. 7-152966

[51] Int. Cl.[6] .................................................. H02B 1/04
[52] U.S. Cl. .................................................. 361/603; 218/75
[58] Field of Search .................. 361/38, 602, 603–605, 361/611, 612, 618, 620; 174/68.2, 70 B, 72 B, 88 B; 218/75, 143, 43–45; 307/112, 113, 147, 148

[56] References Cited

U.S. PATENT DOCUMENTS 3,364,398  1/1968  Stipcevich .................................. 361/602
4,032,820  6/1977  Oishi .......................................... 361/604
4,200,899  4/1980  Volman ...................................... 361/333
4,570,042  2/1986  Yanabu ...................................... 500/148 R
4,816,983  3/1989  Yoshizumi .................................. 361/622

OTHER PUBLICATIONS

Electrical Society Technical Report No. 552, Jul. 1995, pp. 40 and 48.

Primary Examiner—Gerald P. Tolin
Attorney, Agent, or Firm—Fay, Sharpe, Beall, Fagan, Minnich & McKee

[57] ABSTRACT

A transformer station includes a plurality of power transmission lines receiving electric power, a bus bar connected to the power transmission lines, a transformer connected to the bus bar to transform voltage of the electric power supplied from the bus bar, and breakers between one of the power transmission lines and the bus bar and between the transformer and the bus bar. The breakers are aligned along an imaginary line extending substantially parallel to the bus bar.

15 Claims, 17 Drawing Sheets

$1.5H \geq D$

TRANSFORMER STATION AND BREAKER APPARATUS

BACKGROUND OF THE INVENTION

The present invention relates to a transformer station and a breaker apparatus, suitable for a gas insulated substation and a gas insulated switchgear that is a major component of the gas insulated substation, and more particularly to a gas insulated substation and gas insulated switchgear in which the substation is structured in an elongated, narrow-band-like shape to implement space-saving design and to allow the gas insulated substation to be constructed on a narrow and elongated lot or underground where the prior art substation structures would not be accommodated.

The present invention also relates to an indoor-type gas insulated substation, and more particularly to an indoor-type gas insulated substation in which space-saving design is implemented into a gas insulated switchgear to make efficient use of the indoor space of the substation building and to reduce the size of the substation structure and in which a gas insulated switchgear that is easy to check and maintain is incorporated.

DESCRIPTION OF THE RELATED ART

To meet the ever increasing demand for electricity, and extra-high voltage power system is now being introduced into urban areas. At the same time, a multi-system design is rapidly being implemented into a power system-to achieve an improved reliability of electricity providing service, which is vitally important to upkeeping today's advanced information society. Since these power systems are controlled at substations, not only the number of substations is increased, but also their size is enlarged. Since available land is strictly limited in urban areas, these substations are constructed underground as an underground substation, installed in an underground room of a building. Compared to on-the-ground counterparts, the underground substation is subject to severe limitations in floor area availability and space availability, and thus construction cost per unit floor area becomes prohibitive compared to the open-air on-the-ground counterparts. Since the underground rooms of a building find a diversity of applications, the installation of the substation is not necessarily placed high on the priority list in the use of the underground rooms. Small-sized design has been promoted in substations and underground substations by reducing the size of a gas insulated switchgear (GIS). Thanks to state-of-the-art technology, a 550 kV gas-blast circuit breaker (GCB) is single-break structured, and gas insulated buses are three-phase integrated up to 500 kV, and further substantial promotion of compact design in GIS seems difficult. To improve reliability in electricity providing service, buses are multiplied, and accordingly more bus interconnection GCBs and transformer GCBs are introduced, and as a result, GIS is likely to be enlarged rather than small-sized.

With the prior art, acquiring a building lot for a substation is difficult, and thus a substation cannot be constructed with a view to meeting the growing demand for electricity and improving reliability in electricity service.

OBJECT AND SUMMARY OF THE INVENTION

An object of the present invention is to provide a compact transformer station and a compact breaker apparatus.

According to the present invention, a transformer station comprises, at least two power transmission lines adapted to receive therein electric power, at least one bus bar connected to the at least two power transmission lines to receive therein the electric power from the at least two power transmission lines, a transformer connected to the at least one bus bar to transform voltage of the electric power supplied from the bus bar, and at least two breakers arranged at least between one of the at least two power transmission lines and the at least one bus bar and between the transformer and the at least one bus bar, wherein the at least two breakers are aligned along an imaginary line extending substantially parallel to the at least one bus bar.

Since the breakers between the one of the at least two power transmission lines and the at least one bus bar and between the transformer and the at least one bus bar are aligned along the imaginary line extending substantially parallel to the at least one bus bar, distances between the breakers and between the at least one bus bar and the breakers are minimized.

When the transformer station further comprises another bus bar, as seen in a longitudinal direction of the bus bars, the imaginary line may extend between the at least one bus bar and the another bus bar, and/or the another bus bar may be arranged within a width between the at least one bus bar and the at least two breakers, so that a width of the transformer station can be confined substantially between the bus bars or between the at least one bus bar and the at least two breakers. The at least two power transmission lines and/or the transformer may be arranged within the width between the bus bars. When, as seen in the longitudinal direction of the bus bars, the transformer, the at least two breakers and/or the at least one bus bar are arranged within a width between the at least two power transmission lines, the width of the transformer station can be confined substantially between the at least two power transmission lines.

The at least two power transmission lines and/or the transformer may be arranged between the at least one bus bar and the at least two breakers as seen in the longitudinal direction of the bus bars, so that the width of the transformer station can be confined substantially between the at least one bus bar and the at least two breakers. The at least two power transmission lines may extend substantially parallel to the at least one bus bar.

When the transformer station further comprises the another bus bar and another breaker between the at least one bus bar and the another bus bar, the another breaker may be positioned between the at least two power transmission lines, as seen in the longitudinal direction of the bus bars. When the transformer station further comprises the another bus bar and another breaker for electrical communication or disconnection between the bus bars, the another breaker may be positioned between the bus bars, as seen in the longitudinal direction of the bus bars. The another breaker and the at least two breakers may be aligned along the imaginary line.

When one of the at least two breakers between the one of the at least two power transmission lines and the at least one bus bar has first joint lines between the one of the at least two power transmission lines and the one of the at least two breakers and between the at least one bus bar and the one of the at least two breakers, and another one of the at least two breakers between the transformer and the at least one bus bar has second joint lines between the transformer and the another one of the at least two breakers and between the at least one bus bar and the another one of the at least two breakers, the first and second joint lines may project from the at least two breakers in a direction substantially parallel to the imaginary line, so that distances between the one of the at least two power transmission lines and the at least two breakers, between the at least one bus bar and the at least two breakers and between the transformer and the at least two breakers can be minimized in that direction.

When the bus bars extend parallel to each other, and the at least two power transmission lines extend parallel to each other, a stacking direction of the bus bars may be substantially parallel to that of the at least two power transmission lines, so that a distance between the bus bars and the at least two power transmission lines can be minimized. If the bus bars and the at least two power transmission lines are stacked substantially in a contact operating direction of one of the at least two breakers between the one of the at least two power transmission lines and the at least one bus bar, a width between the one of the at least two breakers and (the bus bars and the at least two power transmission lines) is minimized.

The transformer station may further comprise at least one disconnector arranged between one of the at least two breakers and at least one of the one of the at least two power transmission lines, the at least one bus bar and the transformer, and it is preferable for an operating direction of the disconnector to be substantially parallel to a longitudinal direction of the bus bar.

When the transformer station further comprises another bus bar, and another breaker for electrical communication and disconnection between the at least one bus bar and the another bus bar, the another breaker may be arranged, in a direction substantially parallel to the at least one bus bar, between the at least two breakers for electrical communication and disconnection between the one of the at least two power transmission lines and the at least one bus bar and for electrical communication and disconnection between the transformer and the at least one bus bar, so that the transformer station can be connected at both ends thereof opposite to each other to the power transmission lines and the transformer to be connected to the outside of the transformer station.

The transformer station may have a heat exchanger arranged in a river water to cool the transformer station, particularly the transformer thereof, by the river water through the heat exchanger.

According to the present invention, in a breaker apparatus comprising at least two power transmission lines adapted to receive therein electric power, at least two bus bars each of which is connected to the at least two power transmission lines to receive therein the electric power from the at least two power transmission lines, at least two breakers arranged between at least one of the at least two power transmission lines and the at least two bus bars and between the at least two bus bars, the at least one of the at least two power transmission lines extend within a horizontal width between the at least two bus bars, as seen in the longitudinal direction of the at least two bus bars.

When at least one of the at least two bus bars has thereon a first joint portion at which one of the at least two breakers between the at least one of the at least two power transmission lines and the at least two bus bars is connected to the at least one of the at least two bus bars, and a second joint portion at which another one of the at least two breakers between the at least two bus bars is connected to the at least one of the at least two bus bars, the first and second joint portions may be arranged substantially symmetrical relative to the at least one of the at least two bus bars, so that the first and second joint portions can be arranged at the substantially longitudinal same position of the at least one of the at least two bus bars or make a distance between the first and second joint portions in the longitudinal direction of the at least one of the at least two bus bars as small as possible.

When the at least one bus bar has thereon a first joint portion at which one of the at least two breakers between the at least one of the at least two power transmission lines and the at least one bus bar is connected to the at least one bus bar, and a second joint portion at which another one of the at least two breakers between the transformer and the at least one bus bar is connected to the at least one bus bar, the first and second joint portions may be arranged substantially symmetrical relative to the at least one bus bar, so that the first and second joint portions can be arranged at the substantially longitudinal same position of the at least one bus bar or make a distance between the first and second joint portions in the longitudinal direction of the at least one bus bar as small as possible.

The at least two power transmission lines may be arranged away vertically from the at least one bus bar by the at least one breaker including a vertically extending contact moving direction.

An aspect ratio per power transmission line number (line unit aspect ratio) = (an area of a breaker apparatus as seen vertically) ÷ (a maximum horizontal width of the breaker apparatus as seen in a direction parallel to bus bar longitudinal direction)$^2$ ÷ (a (total) number of power transmission lines extending in the breaker apparatus).

In a breaker apparatus comprising, at least two power transmission lines adapted to receive therein electric power, at least one bus bar connected to the at least two power transmission lines to receive therein the electric power from the at least two power transmission lines, and at least two breakers between the at least two power transmission lines and the at least one bus bar, the aspect ratio per power transmission line number of the breaker apparatus may be not less than 2, and the at least two breakers may be arranged at one side of the at least one bus bar.

In a breaker apparatus comprising, at least two power transmission lines adapted to receive therein electric power, at least one bus bar connected to the at least two power transmission lines to receive therein the electric power from the at least two power transmission lines, and at least two breakers between the at least two power transmission lines and the at least one bus bar, the aspect ratio per power transmission line number of the breaker apparatus may be not less than 4, and each of the at least two breakers may transmit only one phase of alternating current.

DETAILED DESCRIPTION OF THE PREFERRED EMBODIMENTS

Figure 1:
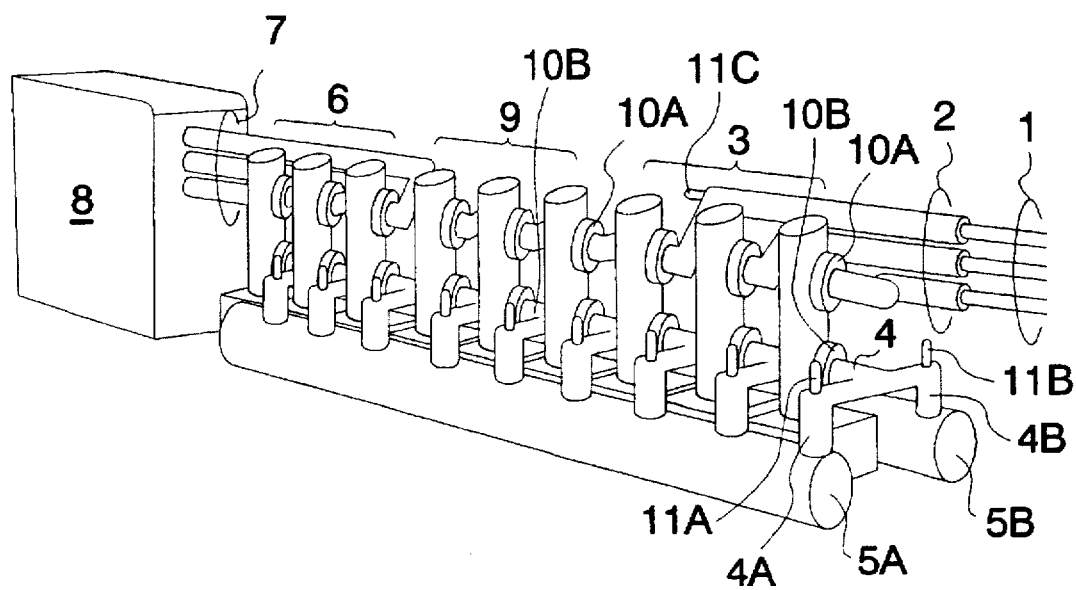
FIG. 1 is a diagram showing the structure of a GIS and transformer according to an embodiment of the present invention.
Figure 2:
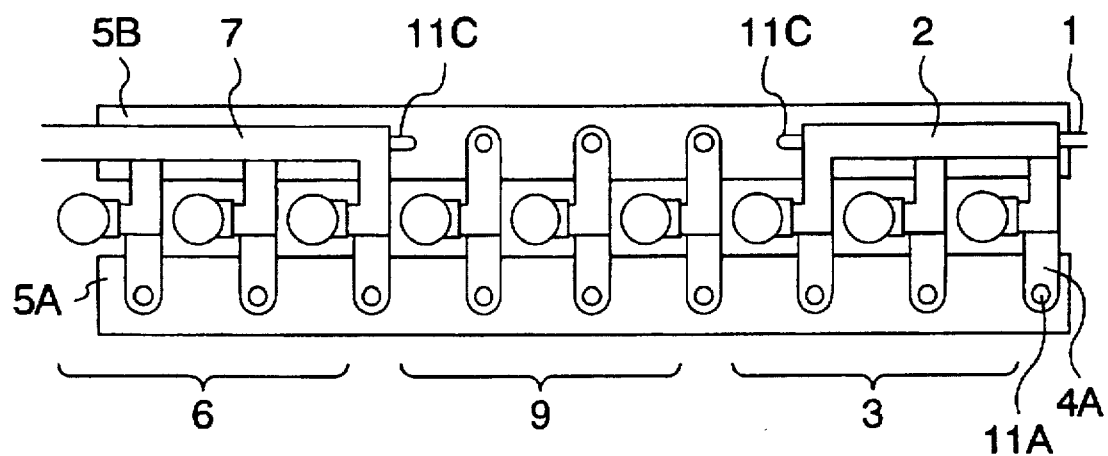
FIG. 2 is a plan view of the GIS portion of FIG. 1.

Referring now to drawings, the embodiments of the present invention are discussed. FIG. 1 shows a GIS of a double main bus system or bar according to one embodiment of the present invention. FIG. 2 is a plan view of FIG. 1. In FIG. 1, main buses 5A, 5B as the claimed bus bars, are of a three-phased integrated type, and vertical type GCBs (as the claimed breakers) are installed along a line between the main buses 5A, 5B in a manner that the projected area of the installation on the floor surface has its length along the main buses longer than its width transversely across the main buses. The GCBs are arranged in the order of line GCBs 3, bus tie GCBs 9, and transformer GCBs 6, and their respective junction blocks 10a, 10b are arranged in parallel with the main buses 5A, 5B. A transmission line 1 is connected to an incoming bus 2 (as a part of the transmission line), which runs above and in parallel with the main bus 5B as seen from FIG. 2, and which is connected to the upper junction blocks 10A of the line GCBs 3. Two lines branch off from each tie bus 4 connected to the lower junction block 10B of the respective line GCB 3 and the respective transformer GCB 6, and are connected to respective main buses 5A, 5B. Disconnectors (DS) 11A, 11B are mounted on the branch portions 4A, 4B of the tie bus 4 corresponding to the respective main buses 5A, 5B in perpendicular to the main buses 5A, 5B. DS 11C is mounted on the end of the incoming bus 2 as shown in FIG. 2. An outgoing bus 7 connected to the upper junction blocks 10A of the transformer GCBs 6 runs above and in parallel with the main bus 5B in a similar way as the incoming bus 2 and is then connected to a transformer 8. The bus interconnection GCBs 9 are connected to the main bus 5B at their upper junction blocks 10A and connected to the main bus 5A at their lower junction blocks 10B. The GIS thus arranged allows a gas insulated substation and GIS to be accommodated in a narrow, band-like elongated lot, which cannot accommodate the GIS structure shown in FIG. 22 and FIG. 23. The main buses shown in FIG. 1 are linear. Alternatively, the main bus line may be arranged to suit the building lot. For example, bent or curved main buses are perfectly acceptable. Since the main buses and the incoming bus run in parallel, tie buses that are in perpendicular to them are required to connect them. In this case, however, responsibility of junctions is partly shared by GCBs, and the length of each tie bus is therefore shortened. Furthermore, in the arrangement shown in FIG. 1, the transformer 8 is installed along a line that extends from the end of the GIS, and thus the gas insulated substation including the transformer can be constructed in a band-like elongated building lot.

The line-unit aspect ratio in the isolated-phase-bus type GCB version of this embodiment is 4.6. The isolated-phase-bus type GCB typically presents an aspect ratio of 4 or more, though it varies depending on the constituting components. In case of a three phase integrated-phase-bus type GCB, the length of the main bus of the GCB per line is shortened, and the line-unit aspect ratio is smaller than that of the isolated-phase-bus type, and is typically 2 or more. At any rate, a more elongated band-like structure is achieved in contrast to the prior art where the line-unit aspect is typically smaller than 2.

Figure 3:
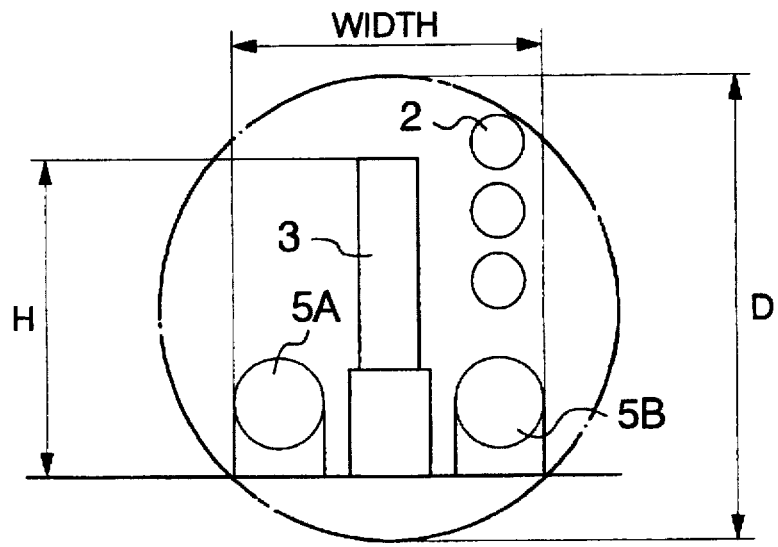
FIG. 3 is a transverse cross-sectional view of the embodiment of FIG. 1.

FIG. 3 is the cross-sectional view of the GIS of FIG. 1 at the line GCB 3 side. As shown by the phantom line circle in FIG. 3, the arrangement in FIG. 1 allows the components to be accommodated within a circular cross-sectional area 1.5 times as high as the GCBs. When a substation is constructed underground or in a tunnel in a mountainous area, for example, a shield process is applied making the construction work quite economic. It is not required that the tunnel having a circular cross-section run level with the horizontal. A tunnel running inclined with respect to the horizontal is perfectly acceptable. Also acceptable as a construction site of a substation is an inclined shaft, one end of which is open and exposed to the ground, and the other end of which communicates with a multi-purpose underground room, and the inclined shaft may serve an entry passage as well.

Figure 4:
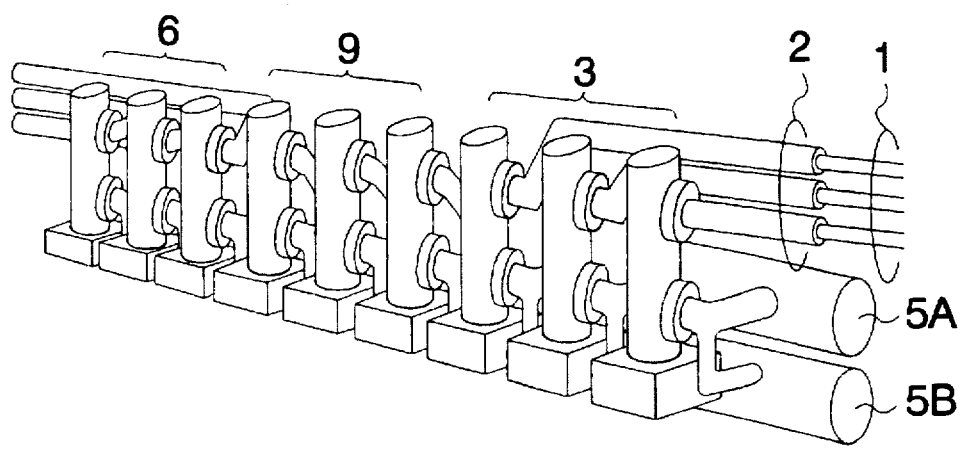
FIG. 4 is a diagram of a gas insulated switch-gear according to another embodiment of the present invention, wherein dual horizontally extending buses are vertically stacked.
Figure 5:
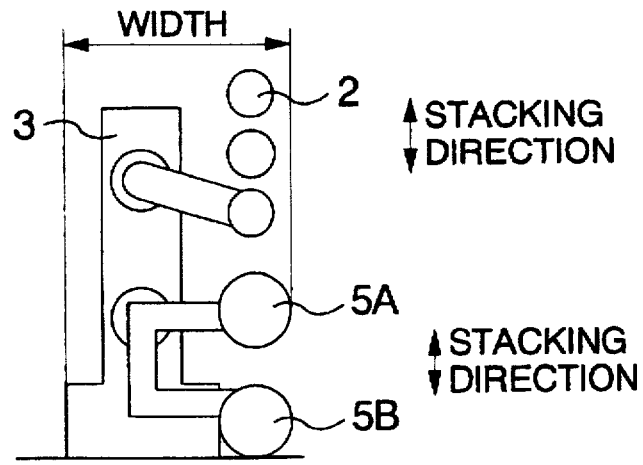
FIG. 5 shows the method of connecting the line GCB of FIG. 4 with the bus.
Figure 6:
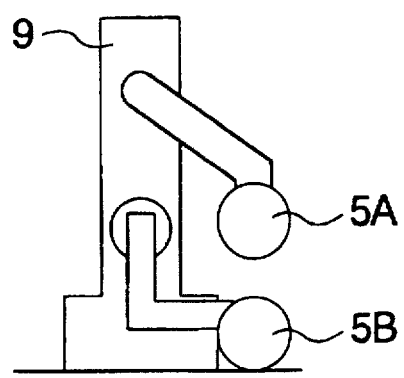
FIG. 6 shows the method of connecting the bus tie GCB of FIG. 4 with the bus.

FIG. 4 shows the example in which the main buses 5A, 5B are arranged vertically on one side of the GCBs. By running the incoming bus 2 above the main buses 5, the transverse width W is further reduced compared to the arrangement in FIG. 1. FIG. 5 shows the connection method of the GCBs 3 with the incoming bus 2 and the main buses 5, and FIG. 6 shows the connection method of the GCBs 9 with the main buses 5. This arrangement makes it unnecessary to hoist the GCBs when they are mounted or dismantled, and horizontally shifting the GCBs is enough for mounting or dismounting. The installation is accordingly easy. Since the same support mechanism is shared by the main buses 5A, 5B, the dual main buses may be brought in for installation after they-are assembled at a factory. This shortens the installation period.

Figure 7:
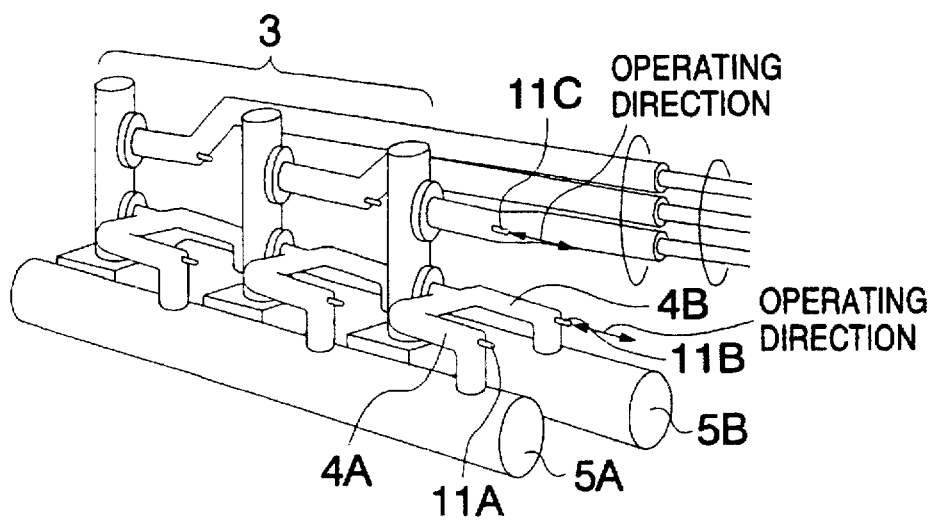
FIG. 7 shows a gas insulated switchgear according to another embodiment of the present invention, in which a disconnector operates in the axial direction of the main bus.
Figure 8:
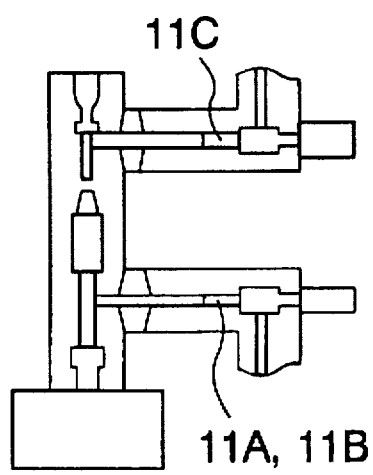
FIG. 8 shows the internal structure of the GCB of the GIS and the disconnector of FIG. 7.

FIG. 7 shows another embodiment in which disconnectors (DS) 11 of the GCBs 3 are mounted. The branch portions 4A, 4B of the tie bus 4 are extended in the direction of the length of the main buses, and the DSs 11 are housed inside the branch portions 4A, 4B. The direction of the operation of the DSs 11 is aligned with the direction of the length of the main buses as seen from the cross-sectional view showing the GCBs of FIG. 7, and an increase in the transverse width W across the GIS is thus precluded. There are times that vertical space for DSs 11 may not be allowed depending on the sizes of the main buses and the GCBs in the embodiment in FIG. 1. In such a case, the arrangement in FIG. 7 is quite useful.

Figure 9:
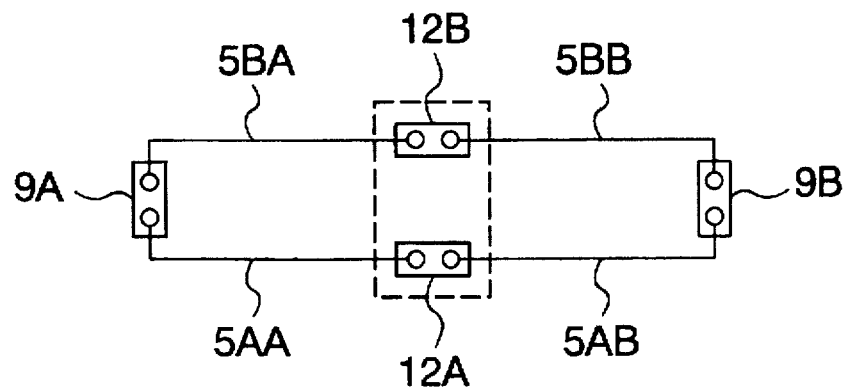
FIG. 9 shows the connection diagram of the main bus tie GCB of a quadruple bus system.
Figure 10:
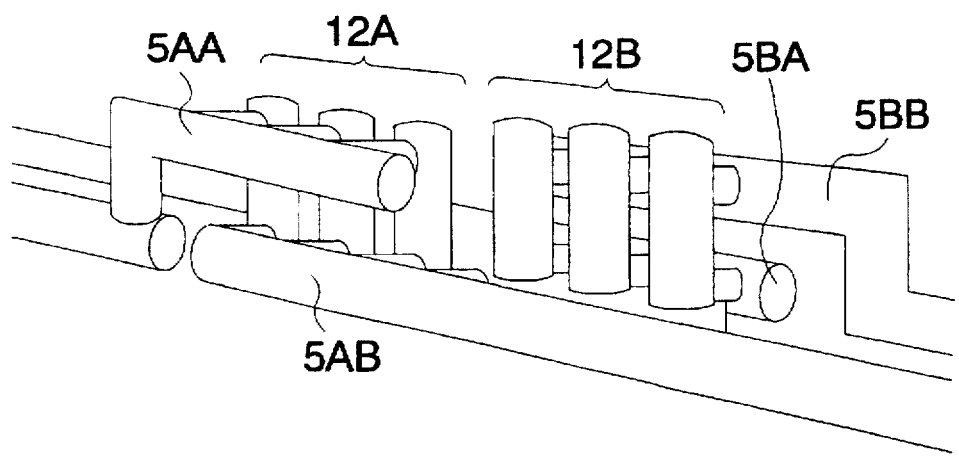
FIG. 10 shows the main bus tie GCB of a quadruple bus system according to yet another embodiment of the present invention.
Figure 11:
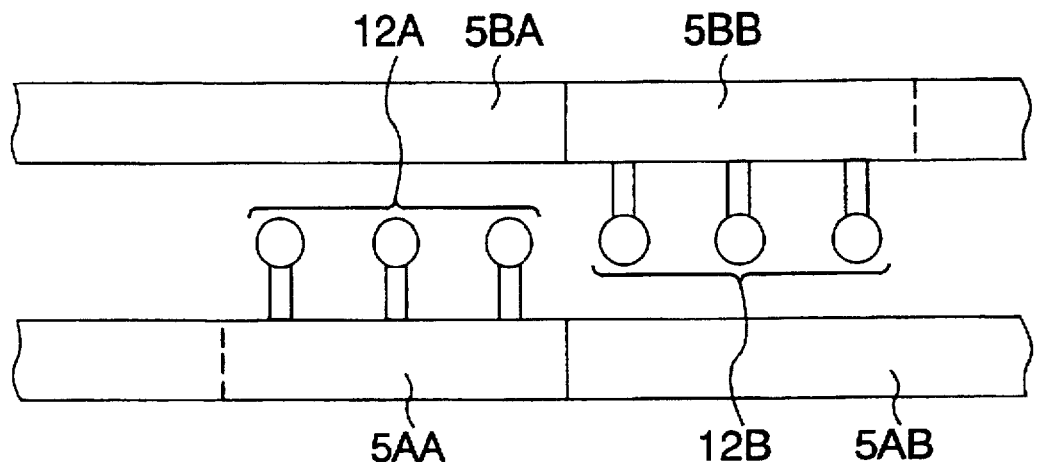
FIG. 11 is a plan view of the bus tie GCB of FIG. 10.

FIG. 10 shows the structure of bus central interconnection GCBs 12, of which a wiring diagram is shown as a quadruple main bus system in FIG. 9. In the quadruple main bus system, the main bus is divided into four, 5AA, 5AB, 5BA, and 5BB, and not only bus interconnection GCBs 9A, 9B for 5A systems and 5B systems are provided but also GCBs 12A, 12b for interconnecting 5AA to 5AB, and 5BA to 5BB are provided. This is a state-of-the-art example of a bus protection system. The bus interconnection GCBs 9A, 9B are logically arranged in the way shown in FIG. 1. As for bus central interconnections GCBs 12A, 12B, however, if both main buses are arranged on the same horizontal plane, the width of the GIS will widen approximately three times. Furthermore, tie buses are lengthened. In the embodiment shown in FIG. 10, one main bus 5AA is arranged above another main bus 5AB on their interconnection position, and vertical type GCBs 12A are used to interconnect both main buses. Furthermore, the interconnection position between the main bus 5BA and the main bus 5BB is shifted off the interconnection region between the main bus 5AA and the main bus 5AB. This arrangement results in the GIS of a quadruple main bus system, with no increase in width W as shown in the plan view in FIG. 11.

Figure 12:
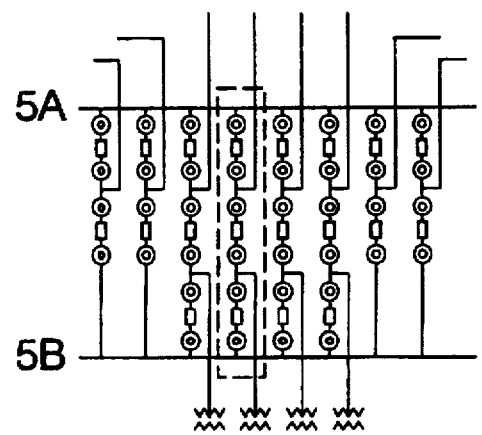
FIG. 12 shows the connection diagram method of a 1½ CB system.
Figure 13:
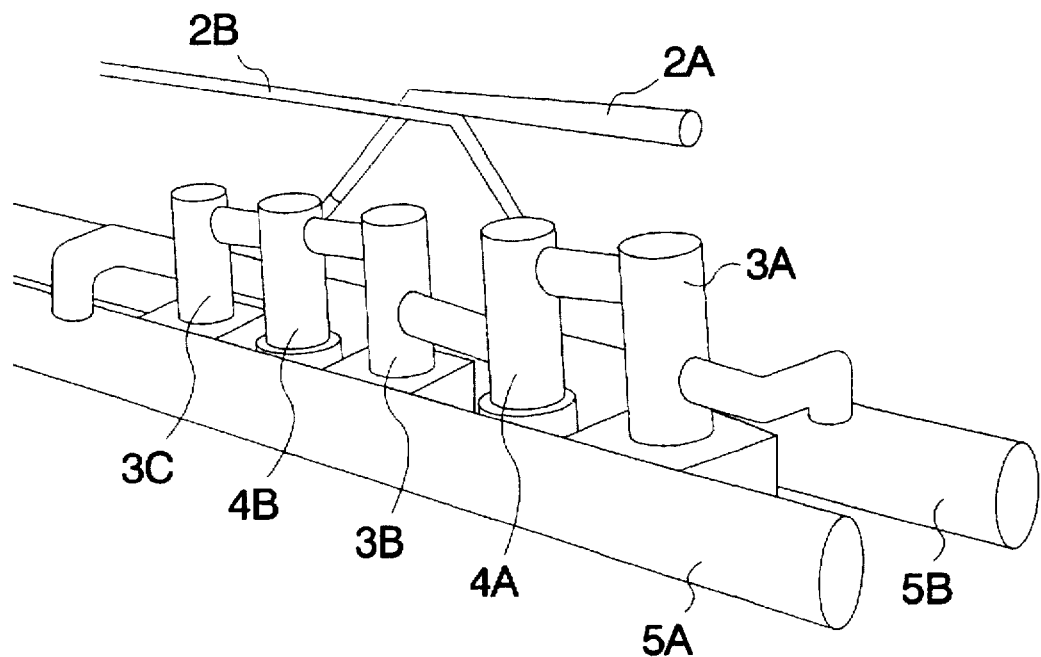
FIG. 13 shows the structure of the GIS to which the 1½ CB system is applied, according to yet another embodiment of the present invention.

FIG. 13 shows an embodiment of the GIS of 1½ CB system, in which the dual main buses 5A, 5B are connected through three GCBs as shown in the wiring diagram in FIG. 12. FIG. 13 shows a line corresponding to the portion surrounded by the dotted box in the wiring diagram in FIG. 12. GCBs 3A, 3B, and 3C are arranged between the dual main buses 5A, 5B in the direction of the length of the main buses. Incoming buses 2A, 2B are disposed above the main bus 5B, and are connected to the tie buses 4A, 4B. This arrangement minimizes the transverse width W. At the same time, the length of the tie buses 4 is shortened.

Figure 14:
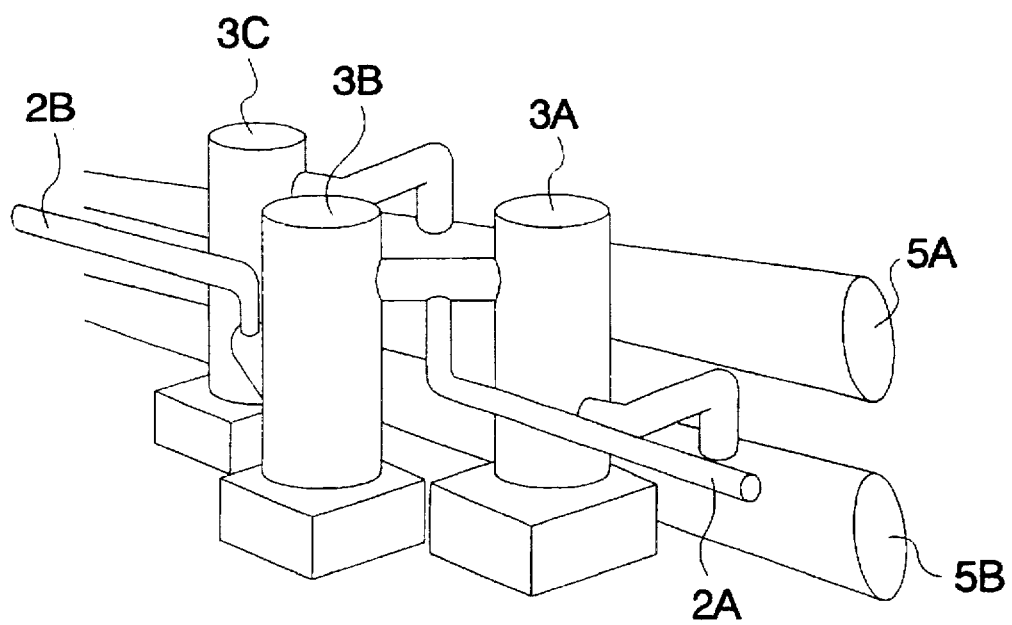
FIG. 14 shows the structure of the GIS to which the 1½ CB system is applied, according to yet another embodiment of the present invention.
Figure 15:
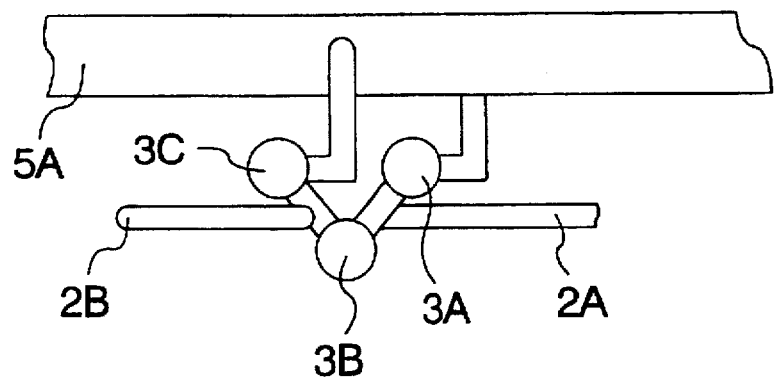
FIG. 15 is a plan view of the GIS of FIG. 14.

FIG. 14 shows another embodiment of the GIS of a 1½ CB system. The main buses 5A, 5B are vertically stacked, and three GCBs 3A, 3B and 3C are placed in a triangular configuration. The base of the triangular configuration is aligned in parallel with the main buses as shown in FIG. 15. In this arrangement, the transverse width remains almost the same but the length of the GCBs is shortened to two-thirds. If the GCBs are isolated-phase-bus type, FIG. 13 shows one phase only. For one line, three times the length in FIG. 13 is required. In such a case, the arrangement in FIG. 14 is very useful.

Figure 16:
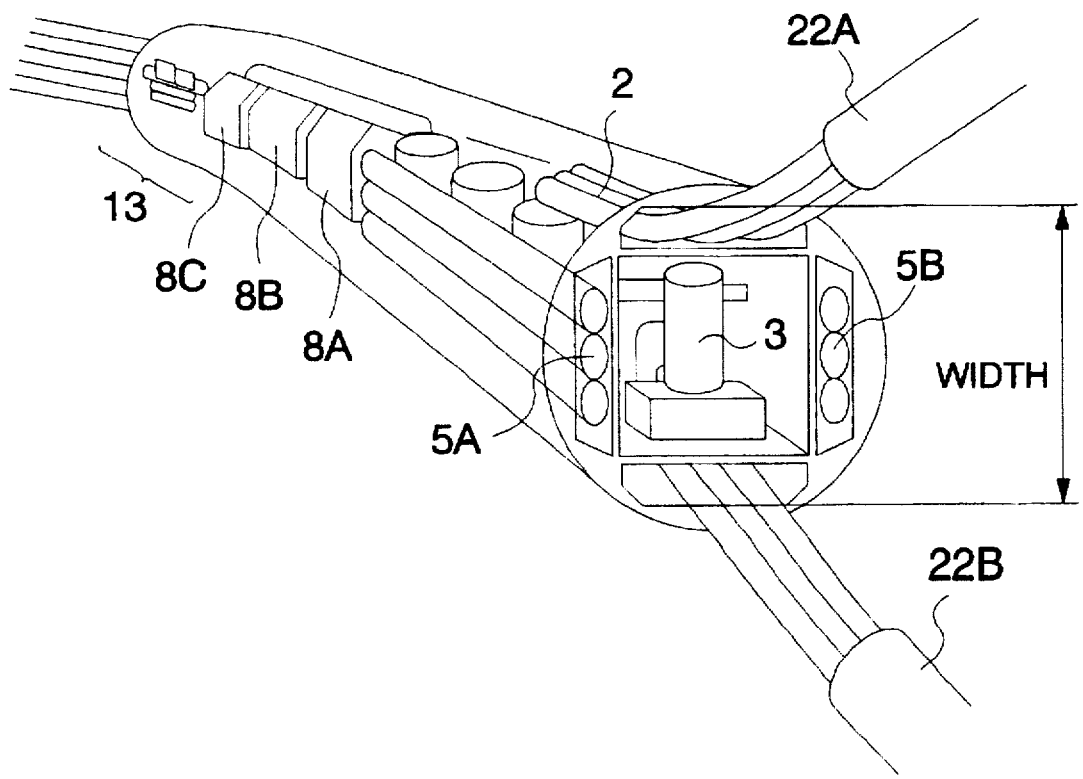
FIG. 16 is a view of another embodiment of the present invention, in which the GIS of the present invention is installed in an underground tunnel.

FIG. 16 shows an embodiment of an underground substation according to the present invention. In this embodiment, the substation is constructed in a tunnel of a circle at cross-section excavated by a shield process. The main buses 5A, 5B are of an isolated-phase-bus type, and arranged on both side of the circular cross-section, and incoming buses 2 from cables 22A, 22B are arranged on top and bottom sides with the GCB 3 at the center. Transformers 8A, 8B, and 8C are linearly arranged in an isolated-phase-bus fashion and are accommodated within the same circle at a cross-section. At the other end of the transformers is a low-voltage GIS apparatus 13, and cables are extended from both ends of the tunnel.

Figure 17:
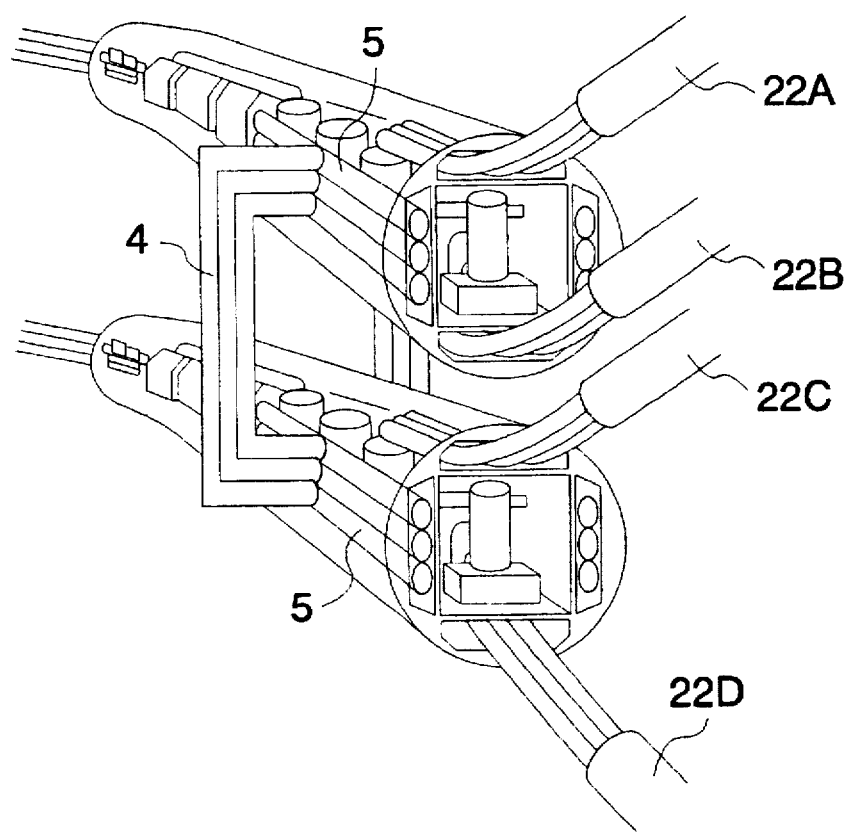
FIG. 17 is a view of yet another embodiment of the present invention, in which the GIS of a multi-line system of the present invention is installed in an underground tunnel.

FIG. 17 shows an embodiment of an underground substation of four-line structure. Although the arrangement in FIG. 16 can accommodate multiple lines by increasing the diameter or length of the tunnel, the arrangement in FIG. 17 accommodates multiple lines, without increasing the diameter or length, by excavating underground round tunnels in parallel either vertically one on the other or horizontally on the same level, on a one-tunnel-two-lines basis, and by installing GISs with tie buses 4 connecting both GISs. In this case, however, it is not required that the two underground tunnels run in parallel. The installation is flexible enough to meet cable laying conditions of cables 22A, 22B, 22C, and 22D, and the conditions of the available building lot. As long as the tie buses 4 are connected, both tunnels may be separately constructed.

The arrangement in FIG. 17, if provided with the GCBs on the tie buses 4, will make the quadruple main bus system shown in FIG. 9. In such an arrangement, in the event of a fire in one underground tunnel, the fire is prevented from reaching the other tunnel. Such an arrangement thus makes an excellent underground substation in view of fire safety.

Figure 18:
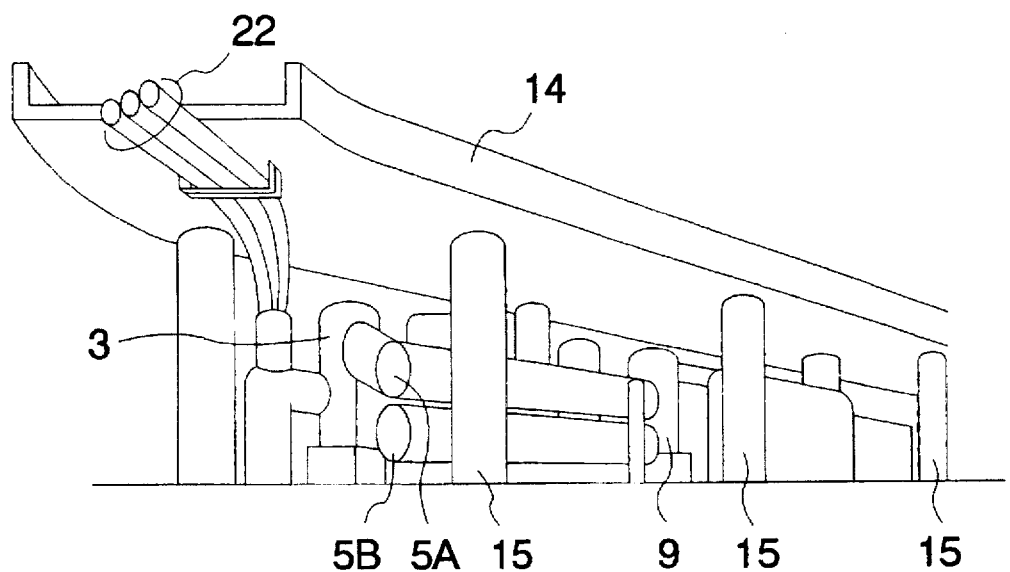
FIG. 18 is a view of yet another embodiment of the present invention, in which the GIS of the present invention is installed below an elevated bridge.

FIG. 18 shows an embodiment in which an substation is constructed below an elevated bridge 14 such as an elevated highway or an elevated railway. In this embodiment, the GCBs 3 are of an integrated-phase-bus type, and dual main buses 5A, 5B are vertically arranged one on the other. The axes of the dual main buses 5A, 5B run parallel with the direction of the length of the elevated bridge so that the substation is accommodated under the superstructure of the elevated bridge 14. A bus interconnection GCB 9 is installed at the ends of the main buses 5A, 5B. If there is a sufficient horizontally transverse space margin (width space available for the GIS varies depending on whether or not it is clear of a bridge footing 15), such an arrangement is practicable. The arrangement is thus flexibly varied to match the available building lot. Since, in this arrangement, the transmission line cable 22 is allowed to run along the elevated bridge 14, the construction of a new transmission route is not required. The cable 22 may be constructed of a gas insulated transmission line.

Figure 19:
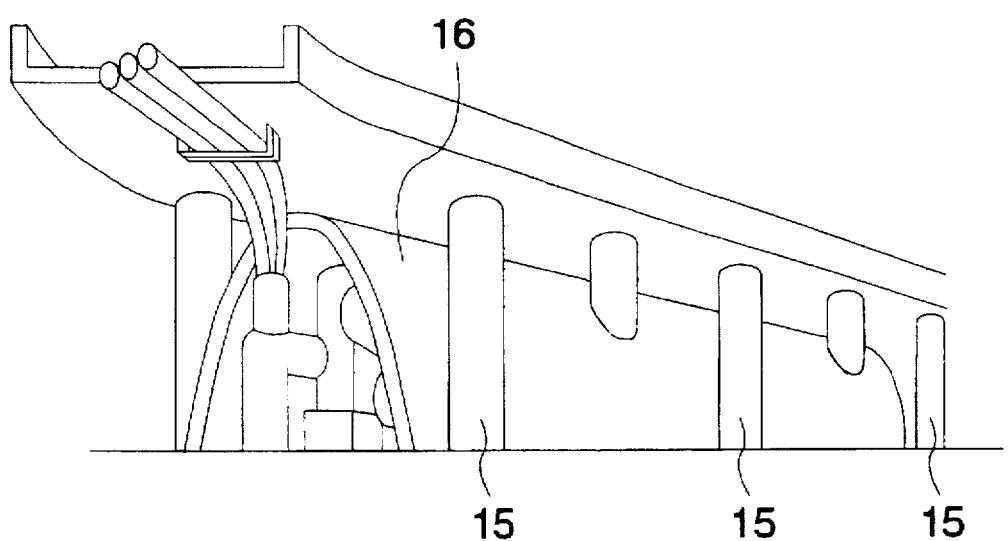
FIG. 19 is a view of yet another embodiment of the present invention, in which the GIS of the present invention is installed in a building under an elevated bridge.

FIG. 19 shows an example in which the GIS is housed in a semi-cylindrical roofed building 16 constructed between bridge footings 15. As already described with reference to FIG. 1 thereafter, the GIS of the present invention is suitably shaped to be accommodated into such a semi-cylindrical roofed building 16. Such a building is strong enough to support the elevated bridge and the bridge footings 15 as well. The building reinforcing the elevated bridge serves as earthquake-proof measure, and also keeps the GIS free from external pollution.

Figure 20:
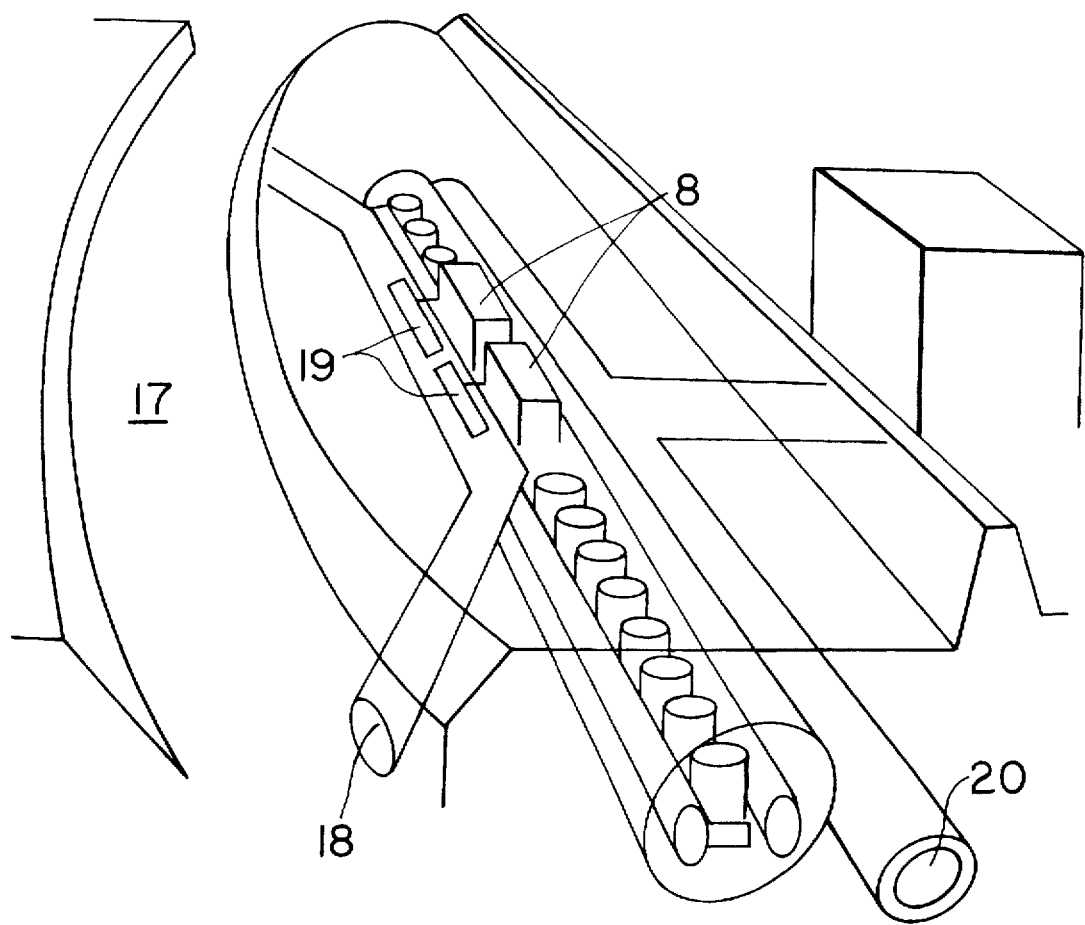
FIG. 20 is a view of yet another embodiment of the present invention, in which water in a river system is used to cool the substation of the present invention.

FIG. 20 shows an embodiment constructed in the vicinity of a river 17. In the substation, its equipment is heated as a result of power passage. Heat generation is particularly noticeable in the transformers 8. In this embodiment, water flow in the river 17 is shunted into a cooling water path 18, the shunted water is put in contact with the periphery of the underground substation to cool it, and a heat exchanger 19 is arranged in the cooling water path 18 to cool the transformers 8. Since the substation can be constructed underground, it can be constructed under a riverbank as shown in FIG. 20. When a substation is constructed under a riverbank, considerations should be given to flooding. Available as safety steps are the adoption of a watertight structure in the same manner as in an undersea tunnel. Another step is that a flood is drained by a drain pump (not shown) into a drain path 20 provided below the level of the underground substation. The drain path 20 is used as an inspection route in normal operation, and communicates at its strategic point with the underground substation via a disaster prevention door. In the event of a fire in the substation, the drain path 20 may be used as an escape route.

Figure 21:
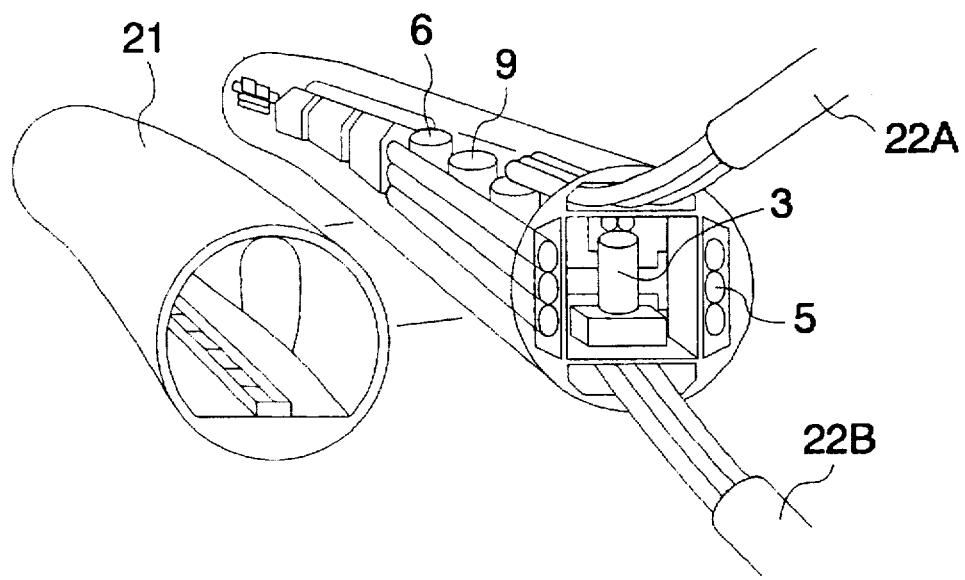
FIG. 21 is a view of yet another embodiment of the present invention, in which the substation equipment of the present invention is installed in tunnels that run in parallel.

FIG. 21 shows an example in which a separate tunnel 21 is further arranged in parallel. The tunnel 21 may be an ordinary one that serves public-use purpose. In this case, the ordinary tunnel may be used to bring in and out the equipment of the substation. If the tunnel is a railway tunnel, it is used to transport the equipment. If the tunnel is a dedicated one, it may serve as a passage for the cooling liquid for the substation besides the above application.

Since, as described above, the gas insulated substation and its GIS are structured in a narrow, elongated band-like configuration, a suitable building lot is easily available even in urban areas where available land is usually scarce. The gas insulated substation of the present invention can be constructed below elevated highways or railways. If it is constructed underground, underground tunnels instead of spacious underground rooms are perfectly acceptable. Thus, more freedom is allowed in the selection of a building lot, and the construction cost involved is less. If a substation is constructed in a mountainous slope, the band-like structure of the substation requires less excavated ground and thus is more acceptable from the standpoint of preserving the environment.

Figure 22:
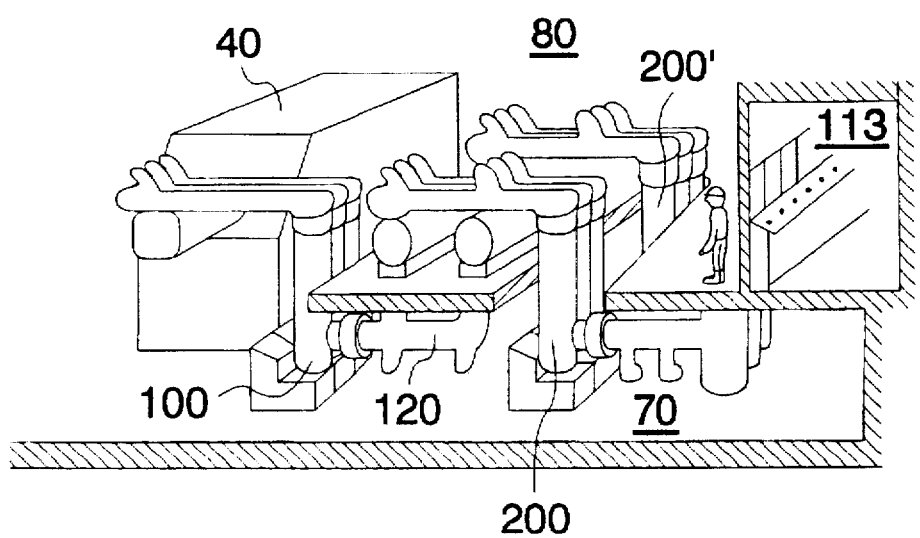
FIG. 22 shows the structure of the GIS of another embodiment.

FIG. 22 shows another embodiment of the present invention. In the GIS in FIG. 22, apparatus 70 to the line side of GCBs 200, 200' is arranged on the same floor surface as the GCBs 200, 200', and apparatus 80 to the bus side is located on an upper floor. The line side apparatus 70 and the bus side apparatus 80 are connected via the GCBs 200, 200' that also work as tie buses. Tie buses 120 penetrate the upper floor and reach the lower floor to be connected to transformer GCBs 100, which are then connected to a transformer 40.

In the GIS thus constructed, compact design is promoted in the layout of each apparatus, and available floor is increased by adopting a two-floor arrangement rather than a single-floor arrangement. The embodiment in FIG. 22 shows a control room 113 housed in a newly available floor area that is saved as a result of the two-floor arrangement. The extra floor space may accommodate other GIS apparatuses, or store equipment other than that for the substation. The extra floor space possible may be used as a garage or a warehouse for efficient use of the entire building.

Figure 23:
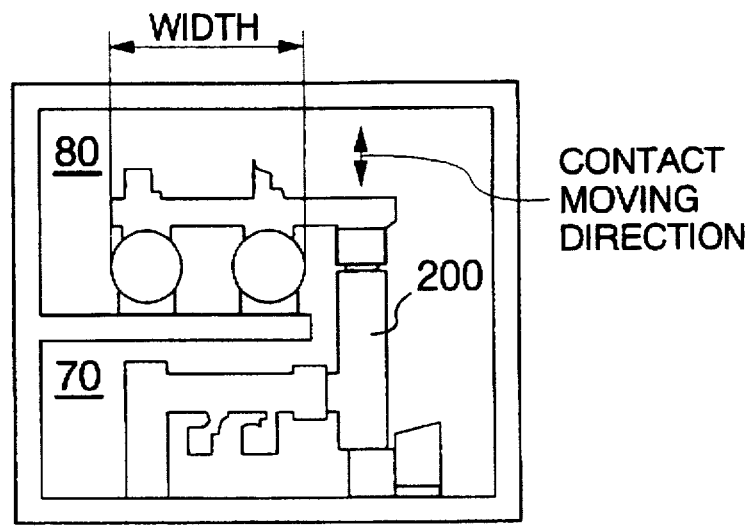
FIG. 23 is a view of yet another embodiment of the present invention, in which apparatuses are installed on separate floors.

FIG. 23 shows an embodiment in which the line side apparatus 70 and the bus side apparatus 80 are placed on the same side relative to the GCBs 200. The vertical arrangement in which the bus side apparatus is placed vertically above the line side apparatus 70 helps decrease required floor area but presents difficulty in inspection and maintenance work. Since the bus side apparatus 80 that is normally elongated should be installed on its floor because of its heavy weight, the line side apparatus 70 that is expanded on its top portion should be installed higher than actually required.

The embodiment in FIG. 23 is free from these problems. The length of the bus side apparatus 80 determines the entire length of the GIS, and thus the entire length is short compared to the prior art. Each apparatus is mounted on a respective floor, facilitating check and maintenance work.

Figure 24:
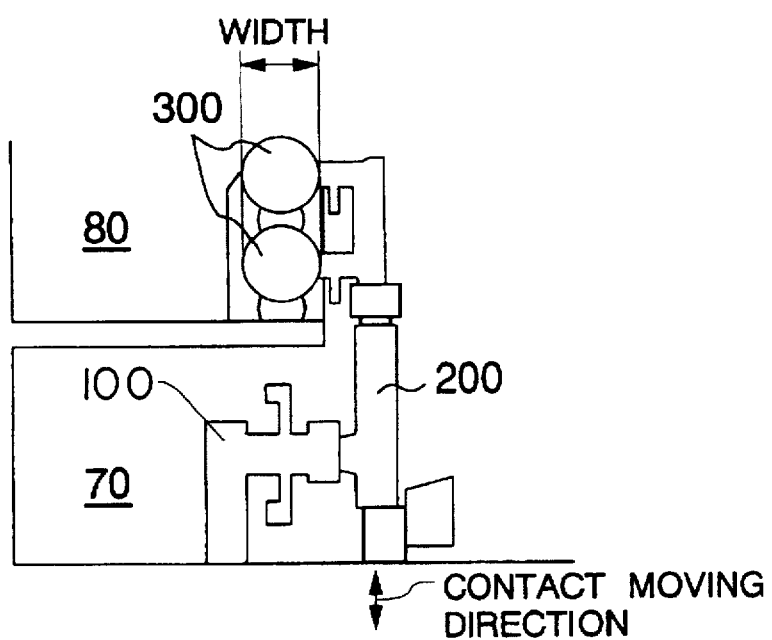
FIG. 24 is a view of yet another embodiment of the present invention, in which a bus is run vertically.
Figure 25:
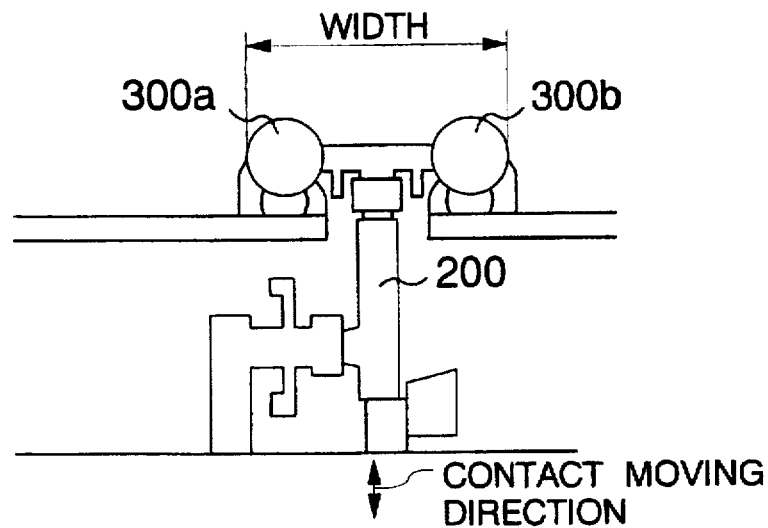
FIG. 25 is a view of yet another embodiment of the present invention, in which a GCB is arranged between buses.

FIG. 24 shows an embodiment in which floor occupancy rate is further reduced. Dual main buses 300 are arranged vertically. This arrangement almost halves the installation area of the bus side apparatus 80. Even if this arrangement is attempted in the prior art, space-saving effect cannot be achieved as intended, because additional tie buses should newly be installed between the GCB and the bus. FIG. 25 shows an embodiment, in which the height of the buses is minimized. The head of the GCB 200 is projected between both main buses 300a, 300b out of the upper floor and connected to both buses 300a, 300b on their sides. Along with other apparatuses properly arranged on the upper floor, this arrangement promotes space saving effect more.

FIG. 24 shows the transformer GCBs 100 of FIG. 22. With the main buses 300 on the same floor, line GCBs 200 and transformer GCBs 100 should be off-axis arranged rather than colinearly arranged. The length of the main buses 300 is lengthened, and its installation area is enlarged.

Figure 26:
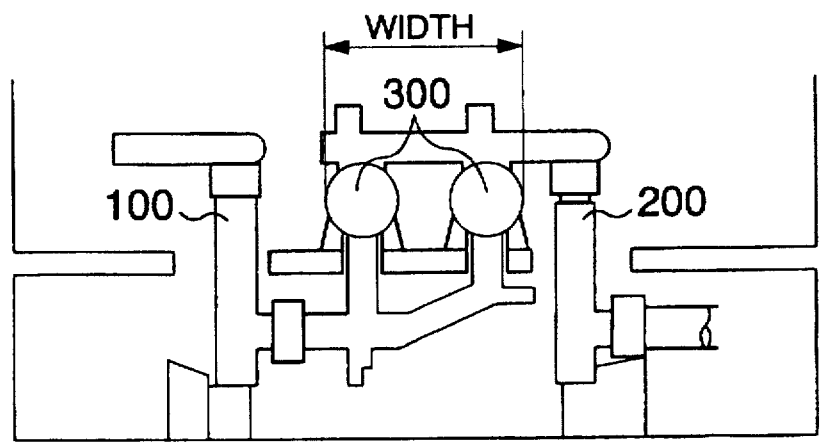
FIG. 26 is a view of yet another embodiment of the present invention, in which a line GCB and a transformer GCB are linearly arranged.
Figure 27:
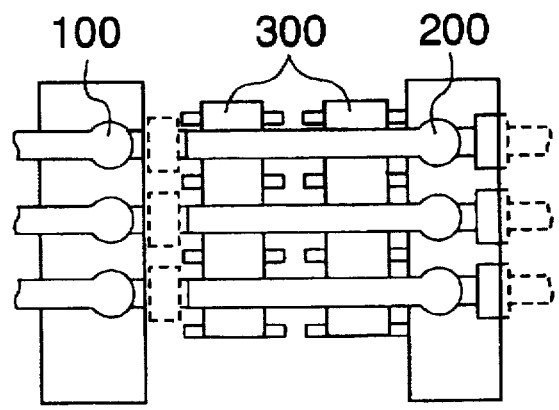
FIG. 27 is a plan view of FIG. 26.

In the embodiment in FIG. 26, arranging the main buses 300 on the upper floor allows conductors to be extended from the top and bottom of the main buses 300. The line GCBs 200 and the transformer GCBs 100 are thus colinearly arranged, and the installation area occupied is halved as shown in the plan view of FIG. 27.

Figure 28:
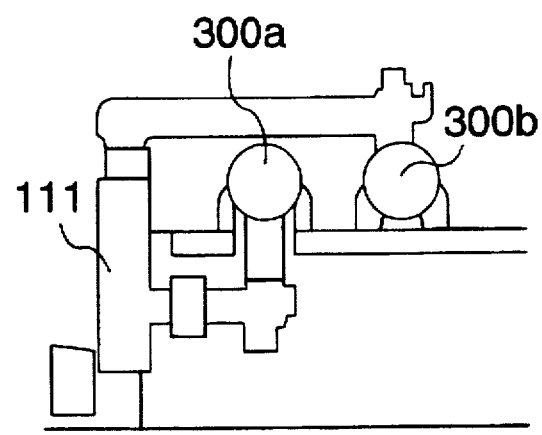
FIG. 28 is a view of yet another embodiment of the present invention, in which a bus interconnection GCB is a vertical type.
Figure 29:
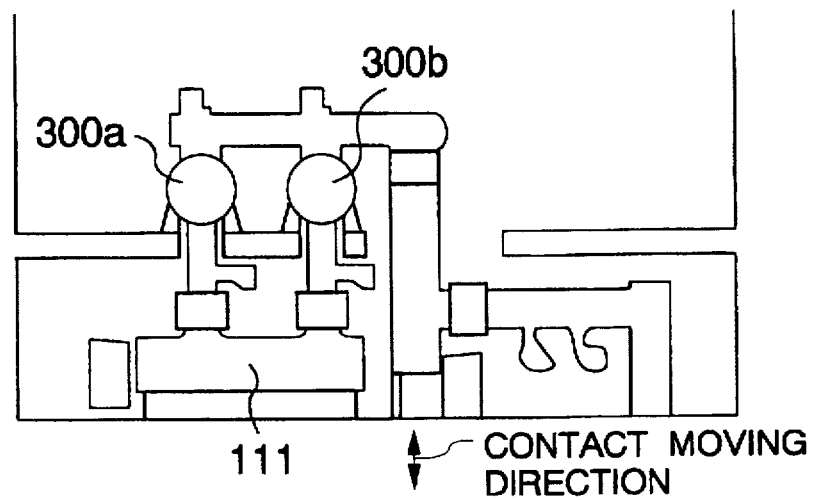
FIG. 29 is a view of yet another embodiment of the present invention, in which a bus interconnection GCB is a horizontal type.
Figure 31:
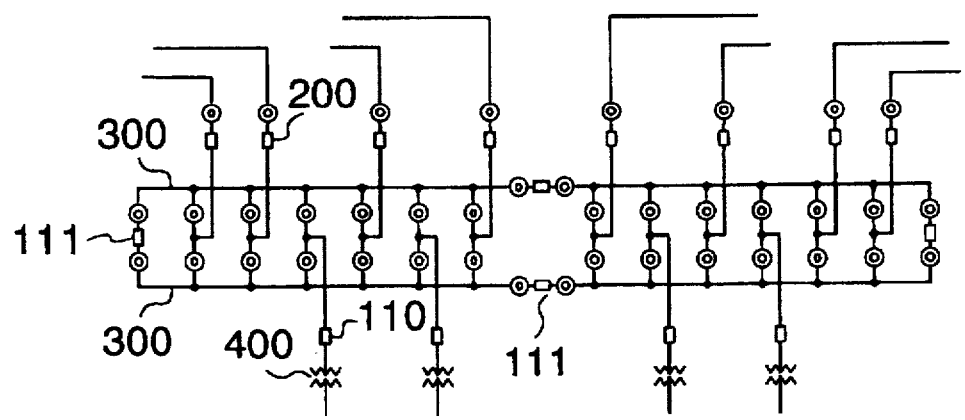
FIG. 31 shows a connection diagram of a bus of a substation.

In embodiments in FIG. 28 and FIG. 29, the dual main buses 300 are provided with bus interconnection GCBs 111 to interconnect the buses at one or more positions, as shown in FIG. 31. This arrangement needs space saving. In the embodiment of FIG. 28, a tie bus is extended from the bottom of one main bus 300a of the dual main buses 300 in the same way as in FIG. 25. In the embodiment in FIG. 29, the bus interconnection GCB 11 is arranged in its horizontally extended position on the lower floor below the dual main buses 300, and tie buses are extended from the bottom of both main buses 300. The occupied area is thus even more reduced. By arranging the main buses 300 on the upper floor, the entire GIS is set to be compact and space saving is thus achieved.

Figure 30:
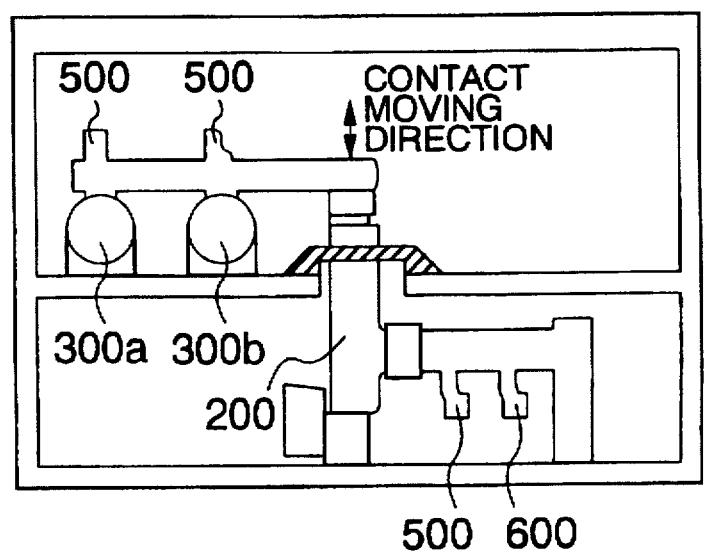
FIG. 30 is a view of yet another embodiment of the present invention, in which a circuit breaker is partially supported on an upper floor.

In the embodiment of FIG. 30, a vertically aligned GCB 200 mounted on the lower floor is also supported by the upper floor, and this arrangement enhances earthquake-proofness.

In an indoor-type gas insulated substation, the building that accommodates it is at least partly constructed of two or more floors, the line side apparatus of the GIS and the bus side apparatus of the GIS are placed on the separate floors with the GCB employed as a branch point between the line side and bus side apparatuses on the different floors, and the GCB is installed in a manner that it penetrates the upper floor. The GCB is thus provided with a sufficient elevation required to achieve intended performance. The apparatuses are placed on the different floors. As a result, the freedom in arrangement is increased, each apparatus is set to be compact, installation area is decreased, space saved is used for other applications. Since the bus is mounted on the upper floor relative to the GCB, the freedom in arranging the entire GIS is increased. In such a multi-floor arrangement, space saving is achieved because there is no need for the installation of an additional tie bus. The GIS provides an excellent earthquake proofness and is easy to maintain.

What is claimed is:

1. A transformer station comprising,
    at least two power transmission lines adapted to receive electric power,
    a first bus bar connected to said power transmission lines to receive the electric power therefrom,
    a transformer connected to said first bus bar to transform voltage of the electric power supplied from said first bus bar, and
    a first breaker electrically connected between one of said power transmission lines and said first bus bar and a second breaker electrically connected between said transformer and said first bus bar, and wherein
    said breakers are aligned along an imaginary line extending substantially parallel to said first bus bar.

2. A transformer station according to claim 1, further comprising a second bus bar, and wherein said imaginary line is located between said first bus bar and said second bus bar, as seen in a longitudinal direction of the bus bars.

3. A transformer station according to claim 2, wherein said power transmission lines are arranged within a width between bus bars, as seen in a longitudinal direction of the bus bars.

4. A transformer station according to claim 1, wherein said power transmission lines are arranged within a width between said first bus bar and said breakers, as seen in a longitudinal direction of the bus bars.

5. A transformer station according to claim 2, wherein the transformer is arranged between the bus bars, as seen in a longitudinal direction of the bus bars.

6. A transformer station according to claim 1, wherein the transformer is arranged between said first bus bar and said breakers, as seen in a longitudinal direction of the bus bars.

7. A transformer station according to claim 1, wherein said power transmission lines extend substantially parallel to said first bus bar.

8. A transformer station according to claim 1, further comprising a second bus bar, and a third breaker electrically connected between said first bus bar and said second bus bar, and wherein said third breaker is positioned between the bus bars, as seen in a longitudinal direction of the bus bars.

9. A transformer station according to claim 1, further comprising a second bus bar, and a third breaker electrically connected between said first bus bar, and said second bus bar, and wherein said third breaker and said first and second breakers are aligned along the imaginary line.

10. A transformer station according to claim 1, wherein said first breaker has a first joint line electrically connected between said one of the power transmission lines and said first breaker and a second joint line electrically connected between said first bus bar and said first breaker, said second breaker has a third joint line electrically connected between the transformer and said second breaker and a fourth joint line between said first bus bar and said second breaker, and said joint lines project from said breakers in a direction substantially parallel to the imaginary line.

11. A transformer station according to claim 1, further comprising a second bus bar, and a third breaker between said first bus bar and said second bus bar, and wherein said third breaker is positioned in a direction substantially parallel to said first bus bar, between said first and second breakers.

12. A transformer station according to claim 1, wherein said first breaker has a first joint line electrically connecting said one of the power transmission lines to the first breaker, and a second joint line electrically connecting said first bus bar to the first breaker, and wherein the joint lines project from a single side of the first breaker in a direction substantially parallel to the imaginary line.

13. A transformer station according to claim 1, wherein said second breaker has a first joint line electrically connecting the transformer to the second breaker, and a second joint line electrically connecting said first bus bar to the second breaker, and wherein the joint lines project from a single side of the second breaker in a direction substantially parallel to the imaginary line.

14. A breaker apparatus comprising,
    at least two power transmission lines adapted to receive electric power,
    at least two bus bars each of which is connected to said power transmission lines to receive the electrical power therefrom,
    a first breaker electrically connected between at least one of said power transmission lines and at least one of said bus bars and a second breaker electrically connected between said bus bars, and wherein
    said one of the power transmission lines extends within a horizontal width between said bus bars, as seen in a longitudinal direction of the bus bars.

15. A breaker apparatus comprising,
    at least two power transmission lines adapted to receive electrical power,
    a bus bar connected to said power transmission lines to receive the electrical power therefrom,
    a breaker electrically connected between one of said power transmission lines and said bus bar, and wherein
    said power transmission lines are separated vertically from said bus bar by said breaker in a vertically extending contact moving direction.

* * * * *

UNITED STATES PATENT AND TRADEMARK OFFICE
CERTIFICATE OF CORRECTION

PATENT NO. : 5,777,842
DATED : July 7, 1998
INVENTOR(S) : M. TSUKUSHI et al

It is certified that error appears in the above-indentified patent and that said Letters Patent is hereby corrected as shown below:

Please add claims 16-23 as set forth below.

16. A transformer station according to claim 1, further comprising a second bus bar, and wherein said second bus bar is arranged within a width between said first bus bar and said first and second breakers, as seen in a longitudinal direction of the bus bars.

17. A transformer station according to claim 1, wherein said first and second breakers are arranged within a width between the at least two power transmission lines, as seen in a longitudinal direction of the bus bars.

18. A transformer station according to claim 1, wherein said first bus bar is arranged within a width between the at least two power transmission lines, as seen in a longitudinal direction of the bus bars.

19. A transformer station according to claim 1, wherein said transformer is arranged between the at least two power transmission lines, as seen in a longitudinal direction of the bus bars.

20. A transformer station according to claim 1, further comprising a second bus bar, and a third breaker electrically connected between said first bus bar and said second bus bar, and wherein said third breaker is positioned between the at least two power transmission lines, as seen in a longitudinal direction of the bus bars.

21. A transformer station according to claim 1, further comprising a second bus bar, and wherein said first and second bus bars extend parallel to each other, the at least two power transmission lines extend parallel to each other, and a stacking direction of the bus bars is substantially parallel to that of the at least two power transmission lines.

UNITED STATES PATENT AND TRADEMARK OFFICE
CERTIFICATE OF CORRECTION

PATENT NO. : 5,777,842
DATED : July 7, 1998
INVENTOR(S) : M. TSUKUSHI et al

It is certified that error appears in the above-indentified patent and that said Letters Patent is hereby corrected as shown below:

22. A transformer station according to claim 1, further comprising a second bus bar, and wherein said first and second bus bars and the at least two power transmission lines are stacked substantially in a contact moving direction of one of said first and second breakers between said one of the at least two power transmission lines and said first bus bar.

23. A transformer station according to claim 1, further comprising at least one disconnector arranged between one of said first and second breakers and one of the at least two power transmission lines, said first bus bar and the transformer, and wherein an operating direction of the disconnector is substantially parallel to a longitudinal direction of the bus bar.

Title page, "15 Claims" should be --23 Claims--

Signed and Sealed this

Third Day of November, 1998

Attest:

BRUCE LEHMAN

Attesting Officer    Commissioner of Patents and Trademarks